United States Patent [19]
Neuhoff et al.

[11] Patent Number: 5,469,268
[45] Date of Patent: Nov. 21, 1995

[54] DISPLAY MODEL-BASED ERROR CRITERION HALFTONING

[75] Inventors: David L. Neuhoff, Ann Arbor, Mich.; Thrasyvoulos N. Pappas, Summit; Nambirajan Seshadri, Chatham, both of N.J.

[73] Assignee: AT&T Corp., Murray Hill, N.J.

[21] Appl. No.: 409,474

[22] Filed: Mar. 22, 1995

Related U.S. Application Data

[63] Continuation of Ser. No. 16,414, Feb. 11, 1993, abandoned, which is a division of Ser. No. 659,793, Feb. 22, 1991, abandoned.

[51] Int. Cl.$^6$ .................... H04N 1/387; H04N 1/405; G06K 9/40
[52] U.S. Cl. .................... 358/298; 358/448; 382/264; 382/309

[56] References Cited

U.S. PATENT DOCUMENTS

| | | | |
|---|---|---|---|
| 5,051,844 | 9/1991 | Sullivan | 358/456 |
| 5,214,517 | 5/1993 | Sullivan et al. | 358/456 |
| 5,239,390 | 8/1993 | Tai | 358/298 X |

OTHER PUBLICATIONS

Allebach, J. P. "Visual model–based algorithms for halftoning images", *Proc. SPIE*, vol. 310, *Image Quality*, pp. 151–158, 1981.
Roetling, P. C. and Holladay, T. M. "Tone Reproduction and Screen Design for Pictorial Electrographic Printing", *J. Appl. Photo. Eng.*, vol. 5, No. 4, pp. 179–182, 1979.
Mannos, J. L. and Sakrison, D. J. "The Effects of a Visual Fidelity Criterion on the Encoding of Images", *IEEE Trans. on Info. Th.*, vol. IT–20, No. 4, pp. 525–536, Jul. 1974.
Jain, A. K. "Fundamentals of Digital Image Processing", *Prentice Hall*, Englewood Cliffs, N.J., esp. pp. 56–57, 1989.
Cornsweek, T. N. "Visual Perception", *Academic Press*, New York, N.Y., 1970.
Netravali, A. N. and Haskell, B. G. "Digital Pictures: Representations and Compression", *Plenum*, New York, N.Y., 1988, esp. pp. 292–297.
Jarvis, J. F., Judice, C. N. and Ninke, W. H. "A Survey of Techniques for the Display of Continuous Tone Pictures on Bilevel Displays", *Comp. Graphics and Image Processing*, vol. 5, pp. 13–40, 1976.
Forney, Jr., G. D. "The Viterbi Algorithm", *IEEE Proc.*, vol. 61, No. 3, pp. 268–278, Mar. 1973.
Viterbi, A. J. "Error Bounds for Convolutional Codes and an Asymptotically Optimum Decoding Algorithm", *IEEE Trans. on Inf. Theory*, vol. IT–13, No. 2, pp. 260–269, Apr. 1967.
Ungerboeck, G., "Adaptive Maximum–Likelihood Receiver for Carrier–Modulated Date–Transmission Systems", *IEEE Trans. on Comm.*, vol. COM–22, No. 5, pp. 624–636, May 1974.
Acampora, A. S. "Maximum Likelihood Decoding of Binary Convolutional Codes on Band–Limited Satellite Channels", *Nat'l. Telecom. Conf.*, 1976.
Viterbi, A. J. and Omura, J. K., "Principles of Digital Communications and Coding", McGraw–Hill, New York, 1979, pp. 272–277.

*Primary Examiner*—Peter S. Wong
*Assistant Examiner*—Eric Frahm
*Attorney, Agent, or Firm*—Thomas A. Restaino

[57] ABSTRACT

A model-based printing method and system for generating halftone output images corresponding to gray-scale-coded input signals. Models for individual two-level (e.g., black on white) printer types allow predicted printer error signals to be generated which can be used to modify the gray-scale coded signals in such manner as to produce binary signals which, when applied to the printer, create halftone images of enhanced quality. In an alternative embodiment binary signals are selected which minimize an error function based on the difference between (i) a predicted perceived image corresponding to the gray scale inputs as filtered by an eye-model filter and (ii) the halftone image resulting from filtering of the binary sequence by a filter modeling the printer followed by the eye-model filter.

21 Claims, 5 Drawing Sheets

DISPLAY MODEL-BASED ERROR CRITERION HALFTONING

CROSS-REFERENCE TO RELATED APPLICATION

This application is a continuation of application Ser. No. 08/016,414, filed on Feb. 11, 1993, abandoned, which is a divisional application of Ser. No. 07/659,793 filed Feb. 22, 1991 now abandoned.

FIELD OF THE INVENTION

This invention relates to apparatus and methods for generating halftone images. More particularly, the present invention relates to such apparatus and methods using binary-valued picture elements to approximate a gray-scale image. Still more particularly, the present invention relates to printing of images on uniform-colored (e.g., white) paper using selectively placed constant valued spots.

BACKGROUND OF THE INVENTION

Digital Halftoning, sometimes referred to as "spatial dithering", is the process of creating a binary approximation to a sampled gray scale image. See for example, R. Ulichney, *Digital Halftoning*, MIT Press, 1987. Sampled gray scale values are typically quantized to have one of a discrete number of values, e.g., 256 or 1024 values. The basic idea in digital halftoning is to replace these quantized picture elements (pixels) from a region of the gray-scale image having an average value of x (where 0=white and 1=black) with a binary pattern of 1s and 0s. In accordance with one halftoning technique, the fraction of resulting 1s is approximately x. The binary pattern is then conveniently used with a display device such as a CRT display or a printer to produce the values for the pixels in the gray-scale halftone image. If the 1s and 0s are supplied to a printer where the 1s are printed as black spots and the 0s are left as white spaces, and if the spots and spaces are sufficiently close together, the eye averages the black spots and white spaces to perceive, approximately, gray level x. In so perceiving the image the eye exhibits a low-pass filtering characteristic. The number of gray-scale samples (pixels) is advantageously equal to the number of bits in the binary pattern.

Recent years have witnessed increasing demand for digital storage and transmission of gray-scale images. In part, this is due to the increasing use of laser printers having a resolution of, e.g., 300 spots (dots) per inch, to produce halftone approximations to gray-scale images such as photographs, art work, design renderings, magazine layouts, etc. The conventional approach to achieving high quality halftone images is to use a high resolution printer. However, it can be shown that the printer resolution required for transparent halftoning with prior art techniques is of the order of 1400 dots/inch. Such printers are often slow and expensive.

Many prior art halftoning techniques assume that the black area of a printed binary pattern is proportional to the fraction of ones in the pattern. This means that the area occupied by each black dot is roughly the same as the area occupied by each white dot. Thus, the "ideal" shape for the black spots produced by a printer (in response to 1's) would be T×T squares, where T is the spacing between the centers of possible printer spots. However, most practical printers produce approximately circular spots. It is clear, therefore, that the radius of the dots must be at least $T/\sqrt{2}$ so that an all-ones binary pattern is capable of blackening a page entirely. This has the unfortunate consequence of making black spots cover portions of adjacent spaces, causing the perceived gray level to be darker than the fraction of ones. Moreover, most printers produce black spots that are larger than the minimal size (this is sometimes called "ink spreading"), which further distorts the perceived gray level. The most commonly used digital halftoning techniques (for printing) protect against such ink spreading by clustering black spots so the percentage effect on perceived gray level is reduced. Unfortunately, such clustering constrains the spatial resolution (sharpness of edges) of the perceived images and increases the low-frequency artifacts. There is a tradeoff between the number of perceived gray levels and the visibility of low-frequency artifacts.

Other distortions that can occur in commonly used laser printers, such as the Hewlett-Packard line of laser printers, include the peculiar characteristic that a white line surrounded by several black lines appears brighter than when surrounded by two single lines. These cause further distortions to the perceived gray levels.

Block replacement is one commonly used halftoning technique used to improve perceived and gray-scale images. Using this technique, the image is subdivided into blocks (e.g. 6×6 pixels) and each block is "replaced" by one of a predetermined set of binary patterns (having the same dimensions as the image blocks). Binary patterns corresponding to the entire image are then supplied to a printer or other display device. Typically, the binary patterns in the set have differing numbers of ones, and the pattern whose fraction of ones best matches the gray level of the image block is selected. This block replacement technique is also referred to as pulse-surface-area modulations. See the Ulichney reference, supra, at pg. 77.

In another halftoning technique known as screening, the gray scale array is compared, pixel by pixel, to an array of thresholds. A black dot is placed wherever the image gray level is greater than the corresponding threshold. In the so called random dither variation of this technique, the thresholds are randomly generated. In another variation, ordered dither, the thresholds are periodic. More specifically, the threshold array is generated by periodically replicating a matrix (e.g., 6×6) of threshold values.

A technique known as error diffusion is used in non-printer halftone display contexts to provide halftoning when ink spreading and other distortions common to printers are not present. See, for example, R. W. Floyd and L. Steinberg, "An Adaptive Algorithm for Spatial Grey Scale," *Proc. SID*, Vol. 17/2, pp. 75–77, 1976.

Like most of the known halftoning schemes, error diffusion makes implicit use of the eye model. It shapes the noise, i.e., the difference between the gray-scale image and the halftone image, so that it is not visible by the eye. The error diffusion technique produces noise with most of the noise energy concentrated in the high frequencies, i.e., so-called blue noise. Thus, it minimizes the low-frequency artifacts. However, since error diffusion does not make explicit use of the eye model, it is not easy to adjust when the eye filter changes, for example with printer resolution, or viewer distance. Error diffusion accomplishes good resolution by spreading the dots. It is thus very sensitive to ink-spreading, in contrast to the clustered dot schemes like "classical" screening. In the presence of ink spreading, error diffusion often produces very dark images, therefore limiting its application to cases with no ink-spreading.

Model-based halftoning approaches have been described generally in the context of printed images. For example, Anastassiou in the paper, "Error Diffusion coding for A/D Conversion," *IEEE Trans. Cir. Sys.*, Vol. CAS-36, No. 9, pp. 1175–1186, September 1989 proposes a "frequency weighted squared error criterion" which minimizes the squared error between the eye-filtered binary and the eye-filtered original gray-scale image. He considers the problem intractable and suggests an approximate approach based on neural networks. Moreover, the disclosed techniques assume perfect printing, i.e., printing without distortion. Allebach, in the paper "Visual Model-Based Algorithms for Halftoning Images," *Proc. SPIE*, Vol. 310, Image Quality, pp. 151–158, 1981, proposes a visual model to obtain a distortion measure that can be minimized, but provides no complete approach to achieve halftoning.

Roetling and Holladay, in the paper "Tone Reproduction and Screen Design for Pictorial Electrographic Printing," *Journal of Appl. Phot. Eng.*, Vol. 15, No. 4, pp. 179–182, 1979, propose an ink-spreading printer model, of the same general type used in the present invention, but uses it only to modify ordered dither so that it results in a uniform gray scale. Since ordered dither produces a fixed number of apparent gray levels, this technique cannot exploit ink spreading to generate more gray levels.

SUMMARY OF THE INVENTION

The above limitations and distortions of prior art halftoning techniques are overcome and a technical advance provided by the present invention, as will be described below and in the accompanying drawing.

Rather than trying to resist printer distortions, as in the conventional approach, the present invention provides methods and apparatus that exploit such characteristics, thereby increasing apparent gray-scale and spatial resolution. A key element in such methods is therefore an appropriate printer model. The present invention provides a general framework for such models and some specific models for laser printers.

An embodiment of the present model-based invention uses least-squares model-based halftoning and includes both a printer model and a model of visual perception. It produces an "optimal" halftoned reproduction by finding the binary image that causes a combination of printer and visual models to match (in the sense of minimizing squared error) the output of the visual model in response to the original gray-scale image. For one-dimensional halftoning (by row or column), this method is conveniently implemented using the Viterbi algorithm. This well known algorithm is described, e.g., in Forney, G. D., Jr., "The Viterbi Algorithm," *IEEE Proc.*, Vol. 61, pp. 268–278. This second approach successfully exploits the printer and visual models to produce more gray levels and better spatial resolution than conventional one-dimensional techniques.

An aspect of the present invention permits gray-scale images to be printed in halftone form while retaining high fidelity and maximum flexibility. Thus, the original image is transmitted to any of a variety of printer locations using gray-scale image encoders, and is halftoned at the receiver, just before printing. This variation of the present invention prints facsimile copies to be produced at a variety of printers or other output devices with improved accuracy. Apart from coding efficiency (the gray-scale values can be sent by optimum coding techniques), this approach permits the halftoning to be tuned to the individual printer. The latter is advantageous because printer characteristics vary considerably, for example, write-black vs. write-white laser printers. In other words it permits model-based halftoning to exploit the characteristics of the specific printer.

When the number of gray-scale pixels is not equal to the number spot locations on a printer, one of several forms of interpolation is typically used to supply intermediate pixel values.

DETAILED DESCRIPTION

Models of Visual Perception

To help understand the use of printer models in accordance with the present invention, a brief introduction to some aspects of human visual perception will be presented. As mentioned above, halftoning works because the eye perceives a set of closely spaced black and white spots as a shade of gray. Alternatively, it may be said that the eye acts as if it contained a spatial low pass filter.

Figure 1:
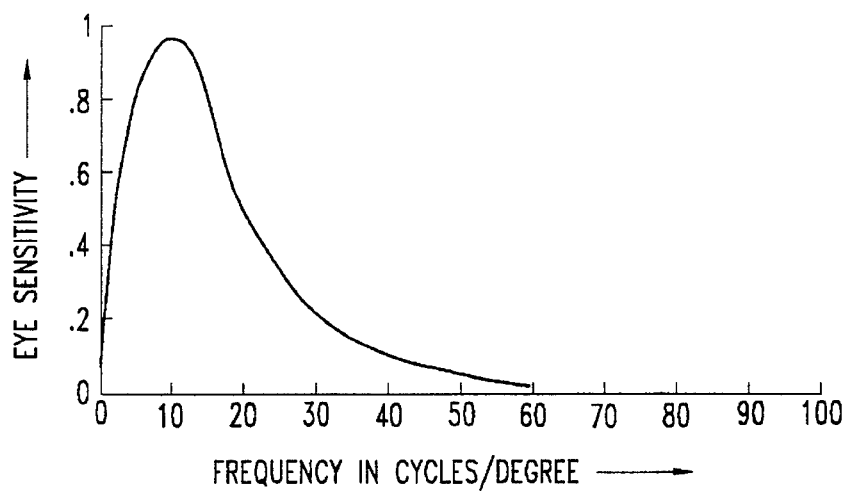
FIG. 1 shows a well-known sensitivity characteristic of the human eye.

Numerous researchers have estimated the spatial frequency sensitivity of the eye, often called the modulation transfer function (MTF). Typical of such is the following estimate for predicting the subject quality of coded images.

$$H(f)=2.6(0.0192+0.114f)\exp\{-(0.114f)^{1.1}\} \tag{1}$$

where f is in cycles/degree. See Mannos, J. L. and D. J. Sakrison, "The Effects of a Visual Fidelity Criterion on the Encoding of Images," *IEEE Trans. on Info. Th.*, Vol. IT-20, no. 4, pp. 525–536, July 1974. This MTF band on the Mannos and Sakrison teachings is plotted in FIG. 1. As indicated by Eq. (1), the eye is most sensitive to frequencies around 8 cycles/degree. Others have variously estimated the peak sensitivity to lie between 3 and 10 cycles/degree. The decrease in sensitivity at higher frequencies is generally ascribed to the optical characteristics of the eye (e.g. pupil size). FIG. 1 shows that the sensitivity of the eye has dropped 3 db from its peak at about 3 and 16 cycles/degree, 20 db at 35 cycles/degree and about 46 db at 60 cycles/degree. The decrease in sensitivity at low frequencies accounts for the "illusion of simultaneous contrast" (a region with a certain gray level appears darker when surrounded by a lighter gray level than when surrounded by a darker) and for the Mach band effect (when two regions with different gray levels meet at an edge, the eye perceives a light band on the light side of the edge and a dark band on the dark side of the edge).

The eye is more sensitive to horizontal or vertical sinusoidal patterns than to diagonal ones. Specifically, it is lest sensitive to 45 degree sinusoids, with the difference being about 0.6 db at 10 cycles/degree and about 3 db at 30 cycles/degree. This is not considered to be large, but it is used to good effect in the most commonly used halftoning technique for printers as will be described more completely below.

Figure 2:
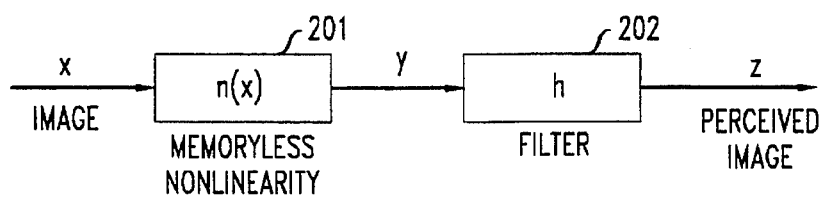
FIG. 2 shows a simple eye model based on prior art teachings.

Many models have been proposed that attempt to capture the central features of human visual perception. For example, see Jain, A. K., Fundamentals of Digital Image Processing, Prentice Hall, Englewood Cliffs, N.J. 1989, especially pp. 56–57; Cornsweek, T. N., Visual Perception, Academic Press, New York, N.Y., 1970; and Netravali, A. N., and B. G. Haskell, Digital Pictures: Representation and Compression, Plenum, New York, N.Y., 1988, especially pp. 292–297. The simplest visual perception models include just a filter, for example the filter of Eq. (1). Another, and perhaps most commonly cited include a memoryless nonlinearity, as shown in FIG. 2. There, the input image, represented by x, is shown being subjected to the memoryless nonlinearity 201 to produce a modified image, y, before being filtered by filter 202, e.g., that of Eq. (1). The output, z, of filter 202 is the perceived image. Such nonlinearities account for Weber's law, which says that the smallest noticeable change in intensity is proportional to intensity (intensity=1−gray level). Most commonly it is represented as a logarithm or power law (e.g., $1-(1-x)^{1/3}$). More complex models include, for example, a filter before the nonlinearity 201 or a bank of filters in place of 202.

Figure 3:
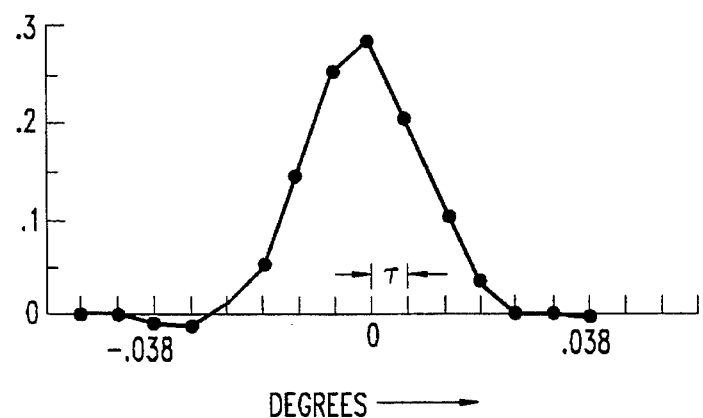
FIG. 3 shows an impulse response for a filter used in modeling human visual perception.
Figure 4:
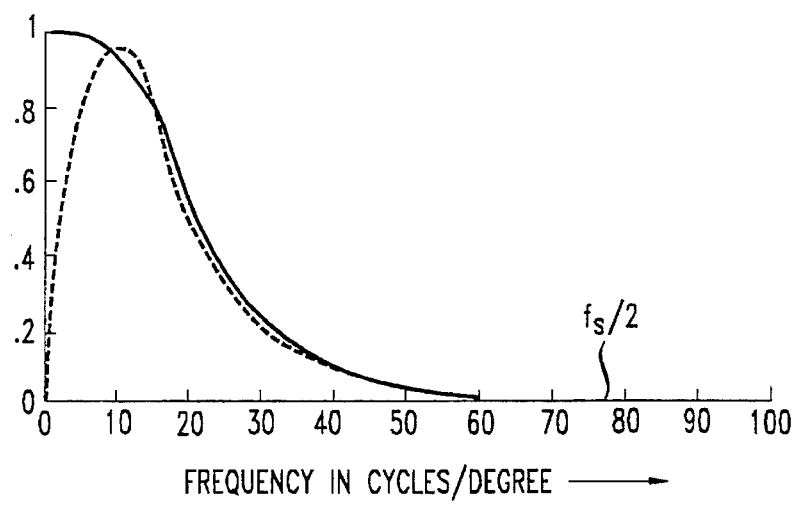
FIG. 4 shows a frequency response for the filter of FIG. 3.

In many cases, practical considerations dictate a finite impulse response (FIR) filter for modeling eye characteristics. Indeed, for certain of the least-squares halftoning techniques described below it proves advantageous to use a one-dimensional discrete-space model of the form $$z_k = M(x_{k-m}, \ldots, x_{k+m}), \qquad (2)$$

where the $x_k$'s are samples of the image (from one line or one column), the $z_k$'s are the model outputs (upon which cognition is based), and $M(.)$ is a sliding-window function with 2m+1 arguments (m is a non-negative integer). Such a model can easily incorporate a memoryless nonlinearity and an FIR filter. Typical models that can be used are typically of the form $$z_k = n(x_k * h_k), \qquad (3)$$

where $n(.)$ is a memoryless nonlinearity, $h_{-m}, \ldots, h_m$ is the impulse response of an FIR filter and * denotes convolution. Also appropriate in some circumstances for the nonlinearity function 201 is $$n(x) = 1 - (-x)^r \qquad (4)$$

for various values of r. For example, others have found r=⅓ to be best. While it is advantageous to choose m as large as possible, a value of m=7 with a 15-th order FIR filter that roughly matched (1) for samples taken at 300 dpi and viewed at 30 inches was found to involve a reasonable level of complexity for many applications. Approximations to the resulting impulse and frequency response are shown in FIGS. 3 and 4, respectively. In FIG. 4, the dotted curve shows the eye MTF of FIG. 1 for comparison; $f_s=1/\tau=157.1$ cycles/degree. The asymmetry of the impulse response in FIG. 3 is an artifact of the filter design program. In FIG. 3, τ is equal to 0.0064 degrees.

Printer Models, Generally

This section will introduce a framework for printer models and some specific models for laser printers. A good model is one that accurately predicts the gray levels produced by a printer. While the teachings of the present invention may be applied to a wide variety of printer types, it proves especially advantageous to employ "write-black" laser printers having, for example, 300 dpi resolution. Typical of such printers are various ones of the family of laser printers marketed by the Hewlett-Packard company, or the Model LZR 1260 by Data Products.

To a first approximation, such printers are capable of producing black spots (more commonly called dots) on a piece of paper, at any and all sites whose coordinates are typically given in the form (iT, jT), for i=1, ..., $N_H$ and j=1, ..., $N_w$, where T is the horizontal and vertical spacing between dots (typically in inches), $N_H$ is the number of printable lines (rows of dots), $N_w$ is the width of a printable line in dots, and (iT, jT) are the coordinates of the jth site from the left, on the ith line from the top. (These coordinates are consistent with matrix notation rather than the usual convention for the plane.) The reciprocal of T is generally referred to as the "printer resolution" in dots per inch (dpi). The site with coordinates (iT, jT) will in the following description be called "site (i,j)". The printer is controlled by sending it an $N_h$ by $N_w$ binary array $B=[b_{i,j}]$, where $b_{i,j}=1$ indicates that a black dot is to be placed at site (i,j) and $b_{i,j}=0$ indicates that the site is to remain white. The latter will be referred to as a "white" dot.

Figure 5:
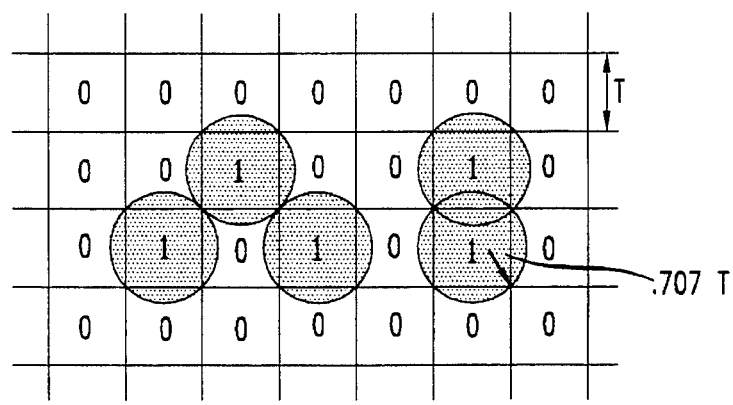
FIG. 5 shows a pattern of black spots in accordance with an ideal printer model.

As illustrated in FIG. 5, black dots produced by an "ideal" printer are black circles (no shading) with radius 0.707T. The latter is the smallest radius such that black circles placed at all sites completely cover the page. The area of such a dot is $1.57T^2$, i.e., 57% larger than a T×T square. Accordingly, horizontally or vertically (but not diagonally) neighboring black dots overlap, and white dots are darkened by neighboring black dots. Specifically, if a white dot has d horizontally or vertically neighboring (contiguous) black dots, then 14.3 d% of it is blackened.

With an actual printer the black dots are not perfectly round, they're not perfectly black, they are not the ideal size, and they may be somewhat misplaced. Other practical considerations apply to real, rather than ideal, printers. For example, a white line surrounded by a pair of black lines is not as bright as when surrounded by several black lines. Them are many potential causes for such distortions, e.g., ink spreading, spreading of the laser beam, interaction of the laser and the charge applied to the drum, the movement of toner particles in reaction to charge, the heat finishing, reflections of fight within the paper, and so on.

It should always be kept in mind that an individual dot at a site (i,j) may only assume one of two values, typically black or white. However, as a result of phenomena such as those mentioned above, the apparent gray level produced by the printer in the vicinity of site (i,j) depends in a complicated way on $b_{i,j}$ and neighboring bits. Thus, due to the close spacing of dots and the limited spatial resolution of the eye, the apparent gray level can be modeled as having a constant value $p_{i,j}$ in this vicinity. That is, although the gray level is not actually constant, the eye responds, only to an average gray level over the site. It is this average gray level that $p_{i,j}$ represents.

In accordance with one aspect of the present invention, therefore, a printer model takes the general form $$P_{i,j} = P(W_{i,j}) \quad 1 \leq i \leq N_H, \; 1 < +j \leq N_w \qquad (5)$$

where $W_{i,j}$ consists of $b_{i,j}$ and the bits in its neighborhood and $p_{i,j}$ is the apparent gray level in the vicinity of site (ij). For concreteness, it is helpful to visualize the model as producing a gray level at all points in a page (not just at integer sites). In this sense a continuous parameter model analogous to the discrete parameter model of Eq. (5) is given by $$u(s,t) = \sum_{i=1}^{N_H} \sum_{j=1}^{N_w} P(W_{i,j}) q(s - iT, t - jT) \qquad (6)$$

$$0 \leq s \leq N_H T, \; 0 \leq t \leq N_w T$$

where u(s,t) denotes the model gray level at a point s inches from the left and t inches down from the top of a page or other defined surface, and $$q(s,t) = \begin{cases} 1, & \text{if } |s| \leq T/2, \, |t| \leq T/s \\ 0, & \text{otherwise} \end{cases} \qquad (7)$$

In tailoring a model of the above form to a given printer, a main task is to identify how the function P specifying $p_{i,j}$ depends on the bits in the neighborhood of $b_{i,j}$. Though a variety of phenomena can contribute to this dependence, it proves advantageous from an analysis and computational viewpoint to limit the dependence of $p_{i,j}$ to one in which $p_{i,j}$ is determined by the values of the binary matrix array $B=[b_{i,j}]$ in a fixed window around the site (i,j). In an illustrative embodiment of the present invention, a 3×3 window centered on site (i,j) is conveniently used, though other windows may be appropriate in other particular embodiments. With this typical 3×3 window, the possible values of P can be listed in a table, e.g., with $2^9$ elements.

An Ink-Spreading Mode

Figure 6:
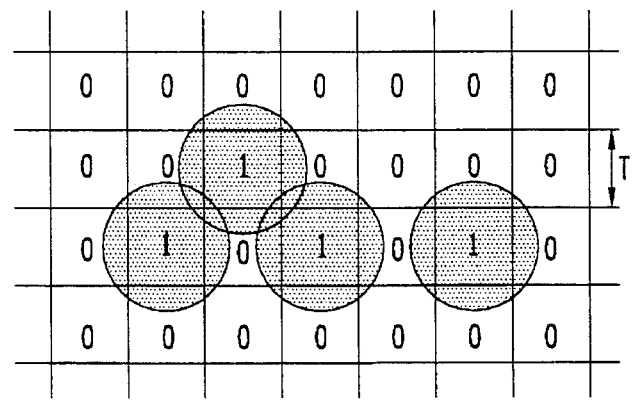
FIG. 6 illustrates an ink spreading phenomenon occurring in certain printers.

A common distortion introduced by most printers is, as illustrated in FIG. 6, that their dots are larger than the minimal covering size, as would occur, e.g., if "ink spreading" occurred. An illustrative "ink-spreading" printer model that accounts for this phenomenon is $$p_{i,j} = P(W_{i,j}) = \begin{cases} 1, & \text{if } b_{ij} = 1 \\ f_1 \alpha + f_2 \beta - f_3 \gamma, & \text{if } b_{ij} = 0 \end{cases} \qquad (8)$$

where $W_{i,j}$ denotes the window surrounding $b_{i,j}$ consisting of $b_{i,j}$ and its eight neighbors, as indexed below, using compass directions, $$W_{i,j} = \begin{bmatrix} b_{nw} & b_n & b_{ne} \\ b_w & b_{ij} & b_e \\ b_{sw} & b_s & b_{se} \end{bmatrix} \qquad (9)$$

Figure 7:
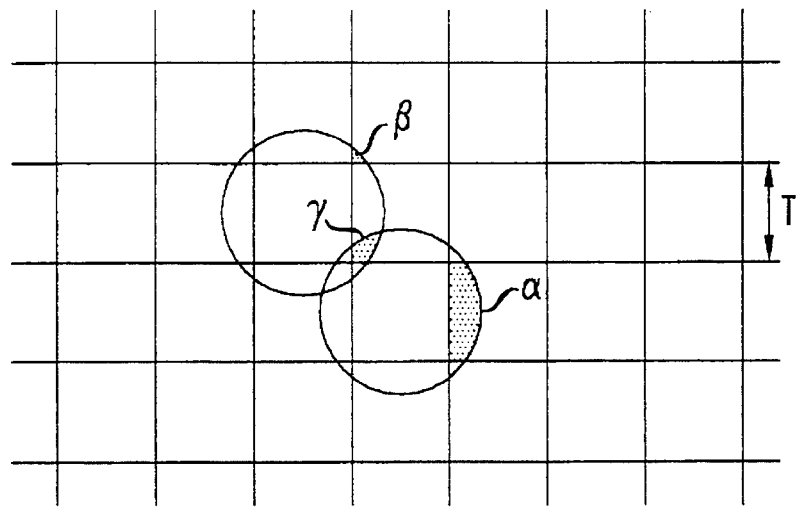
FIG. 7 illustrates geometrically, the meaning of certain parameters used in defining typical printer models.

Function $f_1$ is the number of horizontally and vertically neighboring dots that are black (i.e., the number of ones in the set $\{b_n, b_e, b_s, b_w\}$) function $f_2$ is the number of diagonally neighboring dots (i.e., among $\{b_{nw}, b_{re}, b_{se}, b_{sw}\}$) that are black and not adjacent to any horizontally or vertically neighboring black dot (e.g., in FIG. 6, for the identified site (i,j), $b_{nw}=1$ and $b_n=b_w=0$). Function $f_3$ is the number of pairs of neighboring black dots in which one is a horizontal neighbor and the other is a vertical neighbor (e.g., $b_n=b_w=1$ would be one such pair). The constants α, β and γ are the ratios of the areas of the respective shaded regions shown in FIG. 7 to $T^2$.

In terms of the ratio ρ of the actual dot radius to the ideal dot radius $T/\sqrt{2}$ we have $$\alpha = \frac{1}{4} \sqrt{2\rho^2 - 1} + \frac{\rho^2}{2} \sin^{-1}\left(\frac{1}{\sqrt{2r}}\right) - \frac{1}{2} \qquad (10)$$

$$\beta = \frac{\pi \rho^2}{8} - \frac{\rho^2}{2} \sin^{-1}\left(\frac{1}{\sqrt{2r}}\right) - \frac{1}{4} \sqrt{2\rho^2 - 1} + \frac{1}{4} \qquad (11)$$

$$\gamma = \frac{\rho^2}{2} \sin^{-1}\left(\frac{\sqrt{\rho^2 - 1}}{\rho^2}\right) - \frac{1}{2} \sqrt{\rho^2 - 1} - \beta \qquad (12)$$

The above assumes $1 \leq \rho \leq \sqrt{2}$; i.e., the black dots are large enough to cover a T×T square, but not so large that black dots separated (horizontally or vertically) by one white dot would overlap. The parameter α, which is the largest of the three factors, represents the fraction of a horizontally or vertically neighboring site covered by a black dot. For convenience, this model will be referred to as the α ink spreading model. It should be noted that the model is not linear in the input bits, due to the fact that paper saturates at black intensity. For an ideal printer (no ink spreading) ρ=1, the minimum value, and α=0.143, β=0 and γ=0. For ρ=$\sqrt{2}$, the maximum value, α=0.46, β=0.079 and γ=0.21.

Figure 8:
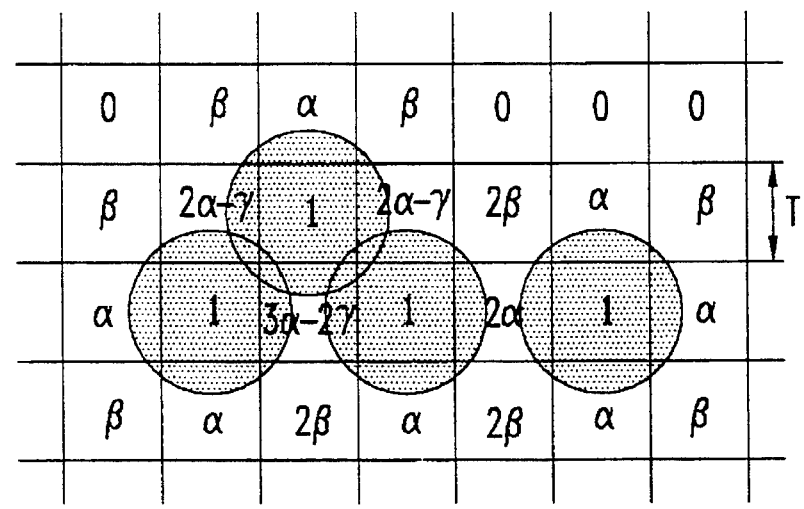
FIG. 8 illustrates the parameters shown in FIG. 7 for particular dot patterns.
Figure 9:
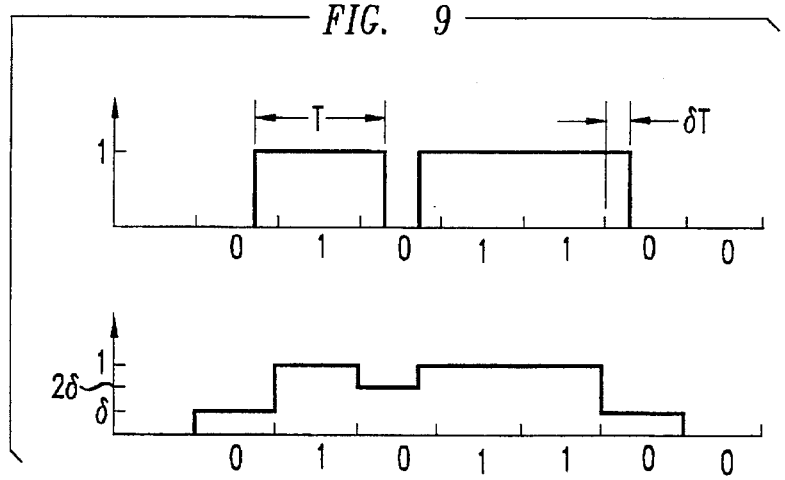
FIG. 9 illustrates certain aspects of a one-dimensional ink-spreading printer model.

For a typical printer of the class noted above ρ~1.25. This value results in α=0.33, β=0.029 and γ=0.98. FIG. 8 illustrates how the dot pattern in FIG. 6 is modeled with these values. To illustrate one use of this model using a 3×3 matrix of surrounding values to predict the effective gray scale in an area, it is useful to consider the array of binary values which includes, for each horizontal string, the repeating 6-bit patterns shown in the left column in Table 1. For example, one such horizontal string would be 100000100000 . . . 100000. This horizontal string is then replicated vertically, i.e., identical ones of such strings occur from the top of the image to the bottom of the image. Table 1 illustrates some interesting statistics relating to such an array.

TABLE 1

| Pattern | Frequency of 1's | Darkness Predicted by Ink-Spreading Model Window 3 (α = 0.33) |
|---|---|---|
| 100000 | .17 | .28 |
| 100100 | .33 | .55 |
| 101000 | .33 | .55 |
| 110000 | .33 | .44 |
| 101010 | .5 | .83 |
| 101100 | .5 | .72 |
| 111000 | .5 | .61 |
| 110110 | .67 | .89 |
| 101110 | .67 | .89 |
| 111100 | .67 | .78 |
| 111110 | .83 | .94 |

TABLE 1-continued

| Pattern | Frequency of 1's | Darkness Predicted by Ink-Spreading Model Window 3 ($\alpha = 0.33$) |
|---------|------------------|------------------------------------------------------------------|
| 111111  | 1.0              | 1.0                                                              |

Since the selected patterns appearing in Table 1 are horizontally periodic, the gray level of a white dot depends only on the presence or absence of horizontally neighboring black dots. Specifically, the gray level of a white dot is $\alpha$, $2\alpha$ or 0, depending on whether there are one, two or no horizontally neighboring black dots. One can see from the gray levels predicted in Table 1 that the ink-spreading model does much to explain how patterns with the same numbers of ones can have different gray levels. For example, it predicts the relative gray levels among the patterns with 3 ones. On the other hand it does not explain why the pattern 110110 produces an image which is darker than the pattern 101110, or why 101010 produces an image which is darker than 111110.

One-Dimensional Models

It proves convenient for some purposes to adopt a simplified one-dimensional printer model. This is equivalent to a model for printing one line (or column) or as a model for printing vertically (or horizontally) invariant images, i.e. those having all horizontal (or vertical) lines the same, as for the patterns of Table 1. With such a model, the input to the printer is a one-dimensional sequence where $$P_k = P(W_k), \quad (13)$$

Figure 10:
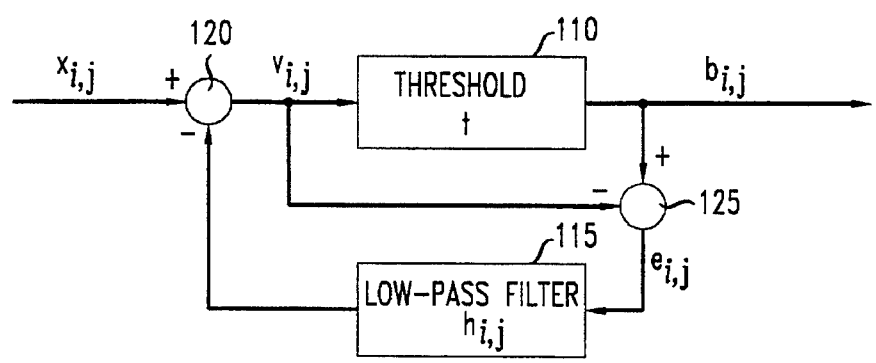
FIG. 10 is a block/flow diagram illustrating the prior art error diffusion halftoning technique.

$W_k$ denotes the bits in some neighborhood of $b_k$, and $P(W_k)$ is some function thereof. A one-dimensional version of the ink-spreading model presented above is $$p_k = P(W_k) = \begin{cases} 0, & \text{if } b_k = 000 \\ \delta, & \text{of } b_k = 001 \text{ or } b_k = 100 \\ 6\delta, & \text{if } b_k = 101 \\ 1, & \text{otherwise} \end{cases} \quad (14)$$

where $W_k = (b_{k-1}, b_k, b_{k+1})$ is a window surrounding $b_k$ and $\delta$ is a parameter between 0 and 1. As illustrated in FIG. 10, this model reflects those situations in which a black dot overlaps a fraction $\delta$ of the neighboring sites to the left and the right. Again the model output is not linearly related to input bits.

To identify the parameter $\delta$, it proves convenient to view this model as a projection of the two-dimensional ink spreading model onto one dimension. Accordingly, $\delta = \alpha = 0.33$ has been found to be a good value for typical ones of the class of printers noted above. Further discussion of one-dimensional models will assume $\delta = \alpha$. Note that for horizontally (vertically) periodic patterns, the one-dimensional model predicts exactly the same gray levels as the two-dimensional model with interleaved horizontal (vertical) all-zero lines.

The need for one-dimensional ink-spreading models with window size larger than 3 will become apparent when considering that in Table 1 the 101010 pattern appears about as dark as 110110, even though it only has three-fourths as many 1's. A close examination of printer output shows that the white line in the middle of 11011 appears much larger and brighter than the white dot in the middle of 01010. Moreover, the white dot in the middle of 1110111 appears larger and brighter than that in the middle of 0110110. When requirements so dictate such effects can be better captured in a printer model with window size larger than 3 (or 3×3 in two dimensions). Thus, while the particular windows and parameters used in the illustrative printer models given above are useful for predicting perceived gray levels with improved accuracy, particular models may require adaptation as dictated by more complete information about (and control of) the underlying physical parameters (e.g., extent of ink spreading), or by more complete understanding of perceptual considerations.

Error Diffusion Halftoning Technique

Error diffusion halftoning techniques have been described generally above. To facilitate a better understanding of improvements achieved by the present invention, some aspects of this prior art technique will now be reviewed.

In the error diffusion halftoning each image pixel is compared to a threshold which depends upon "prior" image pixels, usually above and to the left. Alternatively viewed, each image pixel is compared to a fixed threshold, after a correction factor is applied to its original gray level to account for past errors. Let $[x_{i,j}]$ be a two-dimensional gray-scale image (after possible interpolation to include the same number of dots as the desired binary image), where $x_{i,j}$ denotes the pixel located at the j-th row and the j-th column. It is useful to assume that the image has been scanned, and will be processed left to right and top to bottom. Other orderings are, of course, possible as necessary in particular cases. The binary image $[b_{i,j}]$ produced by error diffusion is obtained by the following set of equations $$v_{ij} = x_{ij} - \sum_{m,n} h_{m,n} e_{i-m,j-n} \quad (15)$$

$$b_{i,j} = \begin{cases} 1, & \text{if } v_{ij} > t \\ 0, & \text{otherwise} \end{cases} \quad (16)$$

$$e_{i,j} = b_{i,j} - v_{i,j} \quad (17)$$

Here $v_{i,j}$ is the "corrected" value of the gray-scale image. The error $e_{i,j}$ at any "instant" (i,j) is defined as the difference between the "corrected" gray-scale image and the binary image. The "past" errors am low-pass filtered and subtracted from the current image value $x_{i,j}$ before it is thresholded to obtain the binary value $b_{i,j}$, where $[h_{i,j}]$ is the impulse response of the low-pass filter. Thus errors are "diffused" over the image.

A diagram of the error diffusion algorithm is shown in FIG. 10. The threshold t represented by block 110 in FIG. 10 is fixed at the exemplary value 0.5, the middle of the gray-scale range. Difference elements are shown as 120 and 125 in FIG. 10. Typically, a page image is scanned left to right and top to bottom i.e., starting at the top left and finishing at the lower right. The low-pass filter $h_{i,j}$ represented by block 115 in FIG. 10 has non-symmetric half-plane support, the two-dimensional equivalent of causality. That is, the effect of a prior pixel (to the left or above) can be accumulated for, but a future pixel, not yet having occurred, does not contribute to any error signal. The filter coefficients are positive and their sum is equal to one, thereby assuring stability. Error diffusion halftoning usually requires only one pass through the data.

Various error diffusion filters have been suggested in the literature (see the Ulichney paper, supra). In the following examples a filter proposed by Jarvis, Judice and Ninke in "A Survey of Techniques for the Display of Continuous-Tone Pictures on Bilevel Displays," *Comp. Graphics and Image Processing*, Vol. 5, pp. 13–40, 1976, will be used. The filter is characterized by Table 2.

TABLE 2

|                |                |                |                | $\frac{7}{48}$ | $\frac{5}{48}$ |
| -------------- | -------------- | -------------- | -------------- | -------------- | -------------- |
| $\frac{3}{48}$ | $\frac{5}{48}$ | $\frac{7}{48}$ | $\frac{5}{48}$ | $\frac{3}{48}$ |                |
| $\frac{1}{48}$ | $\frac{3}{48}$ | $\frac{5}{48}$ | $\frac{3}{48}$ | $\frac{1}{48}$ |                |

TABLE 3

| $\frac{7}{12}$ | $\frac{5}{12}$ |
| --- | --- |

In the one-dimensional version of error diffusion the illustrative values to be used for the filter are shown in Table 3. There is no fundamental difference between the one- and two-dimensional versions of error diffusion.

Use of Printer Models in Halftoning

Figure 11:
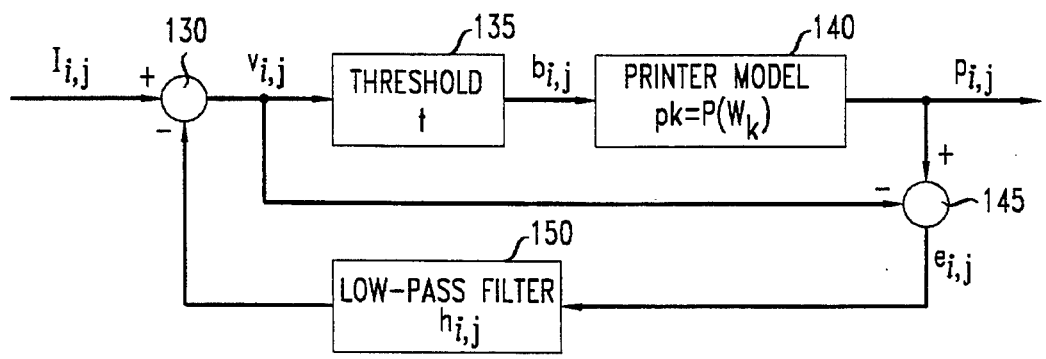
FIG. 11 is a block/flow diagram illustrating modifications to the error diffusion techniques illustrated in FIG. 10.

Through the use of printer models described above, the present invention overcomes many of the disadvantages of the prior art halftoning techniques, including those present in error diffusion halftoning. A block/flow diagram reflecting one aspect of a modified error diffusion system that compensates for ink spreading is shown in FIG. 11. Only the ink spreading contributions of the "present" and "past" pixels are used. Images printed using the system represented in FIG. 11, with printer models characterized by Eq. (8) or Eq. (14) have the improved apparent gray level and, at the same time, have the sharpness characteristic of error diffusion. In particular, the performance of this modified error diffusion system in regions of rapidly changing gray level and in the presence of printer distortions is very good.

In regions of constant gray level, the modified error diffusion algorithm of the present invention produces at least as many gray levels as the prior art "Classic" technique. In common with prior error diffusion techniques, the model-based modifications in accordance with the present invention minimize low-frequency artifacts by shaping the noise, i.e., moving it to the higher frequencies where it is not visible or moving it to a blue noise range, where it proves very pleasant to the eye. In regions of slowly changing gray level, error diffusion does not suffer from the false contouring; there is no need to add microdither to the image.

The system of FIG. 11 differs in overall organization from that of the prior art system shown in FIG. 10 by the inclusion and use of the printer model 140. Thus, in particular, the output of the thresholding operation, i.e., the actual binary pattern sent to the printer (represented by the functional block 135 in FIG. 11), is no longer used to generate the error signal to be fed back to modify the input gray scale values before submitting them to the thresholding step. Rather, a modified version of the binary pattern processed in accordance with printer model 140, and reflecting the particular characteristics of the printer, is used as the feedback sequence. This printer model may advantageously take the form of Eqs. (8–12) or Eq. (5). As in the prior art, this feedback sequence from difference circuit 145 is low pass filtered using, e.g., Eqs. (15–17), with the coefficients of Table 2 or Table 3 above. It will be understood by those skilled in the art that different particular filtering coefficients may be used. It should be noted that the use of past error values in filter 150 is accomplished in standard fashion by storing required past signals in memory forming part of the digital filter 150. The modified error diffusion algorithm that compensates for dot overlap is shown in FIG. 11. The modified error diffusion equations are $$v_{ij} = x_{ij} - \sum_{m,n} h_{m,n} e_{i-m,j-n}^{i,j} \tag{18}$$

$$b_{i,j} = \begin{cases} 1, & \text{if } v_{ij} > t \\ 0, & \text{otherwise} \end{cases} \tag{19}$$

$$e^{i,j,m,n} = P^{i,j,m,n} - v_{m,n} \text{ for } (m,n) < (i,j) \tag{20}$$

where $(m,n)<(i,j)$ means $(m,n)$ precedes $(i,j)$ in the scanning order and $$P_{m,n}^{i,j} = P(W_{m,n}^{i,j}) \text{ for } (m,n)<(i,j) \tag{21}$$

where $W_{m,n}^{i,j}$ consists of $b_{m,n}$ and its neighbors, but here the neighbors $b_{k,l}$ have been determined only for $(k,l)<(i,j)$; they are assumed to be zero for $(k,l)\leq(i,j)$. Since only the dot-overlap contributions of the "past" pixels can be used in (18), the "past" errors keep getting updated as more binary values are computed.

Listing 1 is a sample computer program in the well-known C Language which, when executed on a typical general purpose computer, e.g., the Spark Station Model 1+ processor marketed by Sun Microsystems, will perform the processing shown in FIG. 11 and described above. Listing 1 assumes that the input values for the sampled gray scale image, $I_k$, have been stored, in the processor's memory as have the low pass filter values and other needed data and programs. Those skilled in the art will adapt the procedures in Listing 1 to particular other computers and languages as needed. The output to the printer is, as in all cases described herein, the values for $b_k$.

Particular applications for the above-described printer model-based halftoning technique, and those described below, will use other implementing hardware and, where appropriate, software to suit the specific requirements of the application. For example, in a modification to a printer, the required processing can be accomplished by a microprocessor incorporated within the printer. Model information and the controlling software can conveniently be stored in read only memory units (ROMs).

Printer Model Based Least Squares Error Halftoning

An alternative to the modified error diffusion algorithm described above will now be presented. This alternative approach is based on the well-known least squares error criterion. In this alternative approach, it will be assumed that a printer model, a visual perception model and an image are given. The cascade of the printer and visual perception models will be called the perceptual printing model. The least-squares approach to model-based halftoning in accordance with this aspect of the present invention then finds the binary array (one bit per image pixel) that causes the perceptual printing model to produce an output that is as close as possible (with respect to squared error) to the response of the visual perception model to the original image. Rather than simply assuming the eye is a low-pass filter that averages adjacent bits (as in conventional ordered dither and error diffusion), this method actively exploits the visual model. While previous techniques are sometimes robust to (tolerant of) printer distortions (such as resistance to ink spreading), the present inventive method actively exploits printer distortions to create the best possible halftoned reproduction. The result is more apparent shades of gray and better tracking of edges. Note that, since the eye filter is noncausal, the least-square approach is also noncausal. That is, the decisions at any point in the image depend on "future" as well as "past" decisions. In error diffusion the decisions at any point in the image depend only on the "past". It is this noncausality of the present least-squares approach that helps give it the freedom to make sharp transitions and better track edges.

The least-squares halftoning technique of the present invention is conveniently implemented using a method based on the Viterbi algorithm. See e.g., A. J. Viterbi, "Error Bounds for Convolutional Codes and an Asymptotically Optimum Decoding Algorithm," *IEEE Trans. Inf. Th.*, vol. IT-13, pp. 260–269, April 1967, and G. D. Forney, Jr., "The Viterbi Algorithm," Proc. IEEE, vol. 61, pp. 268–278, Mar. 1973. Because of the Viterbi algorithm, only one pass through the data is required for the least-squares approach. The present least-squares halftoning method using the Viterbi algorithm will now be described in the context of one-dimensional image $x=(x_0, \ldots, x_{N-1})$.

Figure 12:
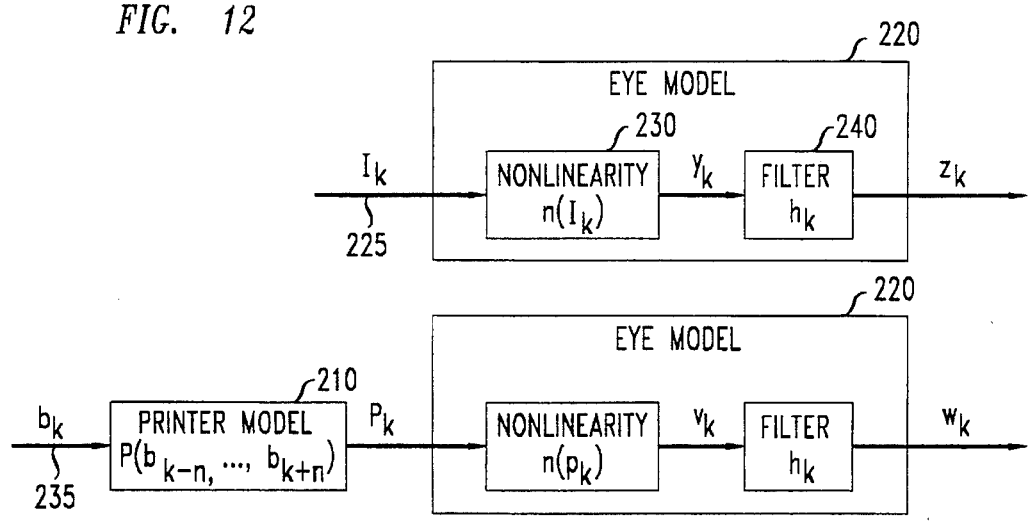
FIG. 12 shows a block/flow diagram of an embodiment of the present invention based on least squares error minimization.

The overall system to be described is shown in FIG. 12. There, the input to the least-squares halftoning system in accordance with the present invention is, a one dimensional image $x=(x_o, \ldots, x_{N-1})$ applied on input 225 in FIG. 12. A printer model 210 shown receiving the binary array $b_k$ or input 235, in FIG. 12 may e.g., be of the type given above in connection with Eq. (13), and have a sliding-window form given by $$p_k = P(b_{k-n}, \ldots, b_{k+n}). \quad (22)$$

This window will cause the printer output to be based on binary inputs extending n bits in either direction from the current bit. Finally, an eye model 220 including a memoryless nonlinearity $n(x)$, shown as 230 in FIG. 12, followed by a finite impulse response filter 240 with impulse response $h_{-m}, \ldots, h_m$, will be used.

In the least-squares approach the half toned approximation $b_0, \ldots, b_{N-1}$ is sought that minimizes the squared error $$\epsilon = \sum_{k=0}^{N-1} (z_k - w_k)^2 \quad (23)$$

where, as illustrated in FIG. 12

$$z_k = y_k * h_k = n(x_k) * h_k \quad (24)$$

$$w_k = v_k * h_k = n(p_k) * h_k \quad (25)$$

$$p_k = P(b_{k-n}, \ldots, b_{k+n}) \quad (26)$$

Again, * indicates convolution.
The boundary conditions are $$b_k = 0 \text{ for } k < m+n, k > N-m-n-1$$

$$x_k = 0 \text{ for } k < m, k > N-m-1.$$

These boundary conditions guarantee that the perceived images (the response of the printer perceptual model to the bits and the response of the perceptual model to the original image) are perfectly white for $k<0$ and $k>N-1$, and gradually darken to the "true" intensity in a border of m+ndots.

In formulating the minimization so the Viterbi algorithm may be conveniently applied, the approach of G. Ungerboeck, "Adaptive Maximum-likelihood Receiver for Carrier-modulated Data-transmission Systems," *IEEE Trans. Commun.*, vol. COM-22, pp. 624–636, May 1974, A. S. Acampora, "Maximum-likelihood Decoding of Binary Convolutional Codes on Band-limited Satellite Channel", *National Telecommunications Conference*, 1976, and in A. J. Viterbi and J. K. Omura, *Principles of Digital Communications and Coding*, McGraw-Hill, New York, 1979, pp. 272–277 is followed generally, as it results in fewer computations. As a first step, it be shown that $$\begin{aligned}\epsilon &\overset{\Delta}{=} \sum_{k=0}^{N-1}(z_k-w_k)^2 \\ &= \|z\|^2 + \sum_{k=m}^{N-m-1}\left(-2v_k Z_k + v_k^2 H_0 + 2v_k \sum_{j=k-2m}^{k-1} v_j H_{k-j}\right) \\ &= \|z\|^2 + \sum_{k=m}^{N-m-1} \gamma_k, \end{aligned} \quad (27)$$

where $$\|z\|^2 = \sum_{k=0}^{N-1} z_k^2,$$

$$\gamma_k = -2v_k Z_k + v_k^2 H_0 + 2v_k \sum_{j=k-2m}^{k-1} v_j H_{k-j}, \quad (28)$$

$$Z_k = \sum_{j=k-m}^{k+m} z_j h_{j-k},$$

$$H_k = \sum_{j=k-m}^{k+m} h_{j-k} h_j.$$

From Eq. (27), the squared error $\epsilon$ is the sum of $\|z\|^2$, k which does not depend on the bits $b_0, \ldots, b_{N-1}$ to be selected, plus the $\gamma k$'s, each depending on a different subset of the bits. In the Viterbi algorithm, the minimization of $\epsilon$ is simplified by introducing the notion of state, which is a set of bits from which a $\gamma k$ can be determined. Since $\gamma k$ is a function of $u_{k-2m}, \ldots u_k$ and since each $v_j$ is a function of $b_{j-n}, \ldots b_{j+n}$, the state at time k may be taken to be $$S_k = (b_{k-2m-n+1}, \ldots, b_k, \ldots, b_{k+n}), \quad (29)$$

i.e., it consists of 2m+2n consecutive bits neighboring $b_k$ will be considered to be the "present" bit and $b_{k+n}$ to be the "most recent" bit. The state has been defined so that $\gamma k$ can be determined from $S_{k-1}$ and $S_k$, so that $S_k$ can be determined from $S_{k-1}$ and the most recent bit $b_{k+n}$, and so that $S_k$ contains as few bits as possible. In essence, the state $S_{k-1}$ summarizes all that one needs to know to determine $\gamma k$ expect the present bit. It follows from Eqs. (27), (28) and the definition of state that $$\epsilon = \|z\|^2 + \sum_{k=m}^{N-m-1} \mu(S_{k-1}, S_k), \quad (30)$$

where $\mu(.,.)$ is a function determined by Eq. (28) and from the boundary condition $S_{m-1}=(0, \ldots, 0)$.

Since there is a one-to-one correspondence between sequences of bits $b_0, \ldots, b_{N-1}$ and sequences of states $S_{m-1}, \ldots, S_{N-m-1}$, one may minimize $\epsilon$ by finding the state sequence $S_{m-1}, \ldots, S_{N-m-1}$ that minimizes Eq. (30), rather than finding the binary sequence that minimizes Eq. (27). It is then a straightforward matter to derive the binary sequence from the state sequence.

The Viterbi algorithm is an efficient way to find the minimizing state sequence. Let S denote the set of all possible states (the set of all binary sequences of length 2m+2n). For each k in the range m,m+1, ..., N−m−1 and for each state s ∈ S the Viterbi algorithm finds a state sequence $S_m, \ldots, S_{k-1}, s$ (ending at time k in state $S_k=s$) for which $$\|z\|^2 + \sum_{j=1m}^{k} \mu(S_{j-1}, S_j) \quad (31)$$

is minimum among all state sequences ending in s at time k. Let $\sigma_k(s)$ denote the minimizing state sequence, and let $\epsilon_k(s)$ denote the resulting minimum value. Then the state sequence that minimizes Eq. (30) (i.e., the desired solution) is $(\sigma_{N-m-1}(s^*), s^*)$ where $s^*$ is the state for which $\epsilon_{N-m-1}(s^*)$ is the smallest.

For each k starting with k=m and each s, the algorithm finds $\epsilon_k(s)$ and $\sigma_k(s)$ using the recursion:

$$\epsilon_k(s) = \min_{S_{k-1}} \{\epsilon_{k-1}(S_{k-1}) + \mu(S_{k-1}, s)\} \quad (32)$$

where $S_{k-1}^*$ achieves minimum in $\epsilon_k(s)$ and $S_{m-1}=(0, \ldots, 0)$.

In regard to the complexity of the algorithm, for any state s there are precisely two states that can precede it. Thus the minimization in Eq. (30) involves two computations of $\mu(.,.)$, an addition and a binary comparison. If sufficient memory is available, the function $\mu$ may be precomputed and saved as a matrix. In this case, the complexity of the algorithm, in operations per dot, is proportional to the number of states: $N_s=2^{2m+2n}$. Thus, complexity increases exponentially with m and n, but is independent of the size of the image.

There are ways to reduce the number of states (complexity), at the cost of some suboptimality, i.e., an increase in $\epsilon$. The state reduction approach based on the following observations: The state at time k−1 was defined in such a way that it contained all bits needed to determine $v_{k-2m}, \ldots, v_{k-1}$, which in turn enter into the third term of Eq. (28), namely, $$2v_k \sum_{j=k-2m}^{k-1} v_j H_{k-j} \quad (34)$$

Ordinarily, some of the last terms of H, say $H_{-2m}, \ldots, H_{-2m+t-1}$, are so small that the corresponding terms of the sum, $v_j H_{k-j}$, can be dropped without much effect. In this case, the state at time k may be redefined as $$S_k=(b_{k-2m-n+t+1}, \ldots, b_k, \ldots, b_{k+n}), \quad (35)$$

so that now there are only $2^{2m+2n-t}$ possible states.

It will be seen that, when compared with the prior art techniques, e.g., those of Anastassiou, the present invention does not assume perfect printing. The addition of a printer model in accordance with the teachings of the present invention provides a major advance in the art. Also, the above-described mean square error process provides a closed form solution that will be useful in a variety of particular applications to those skilled in the art. It is deemed that those skilled in the art with the detailed algorithmic description and program example for the error diffusion embodiment will be well able to implement the above-described Viterbi-based implementation of the mean-square-error algorithm for generating the binary array for application to a printer such as those in class of laser printers identified above.

Figure 13:
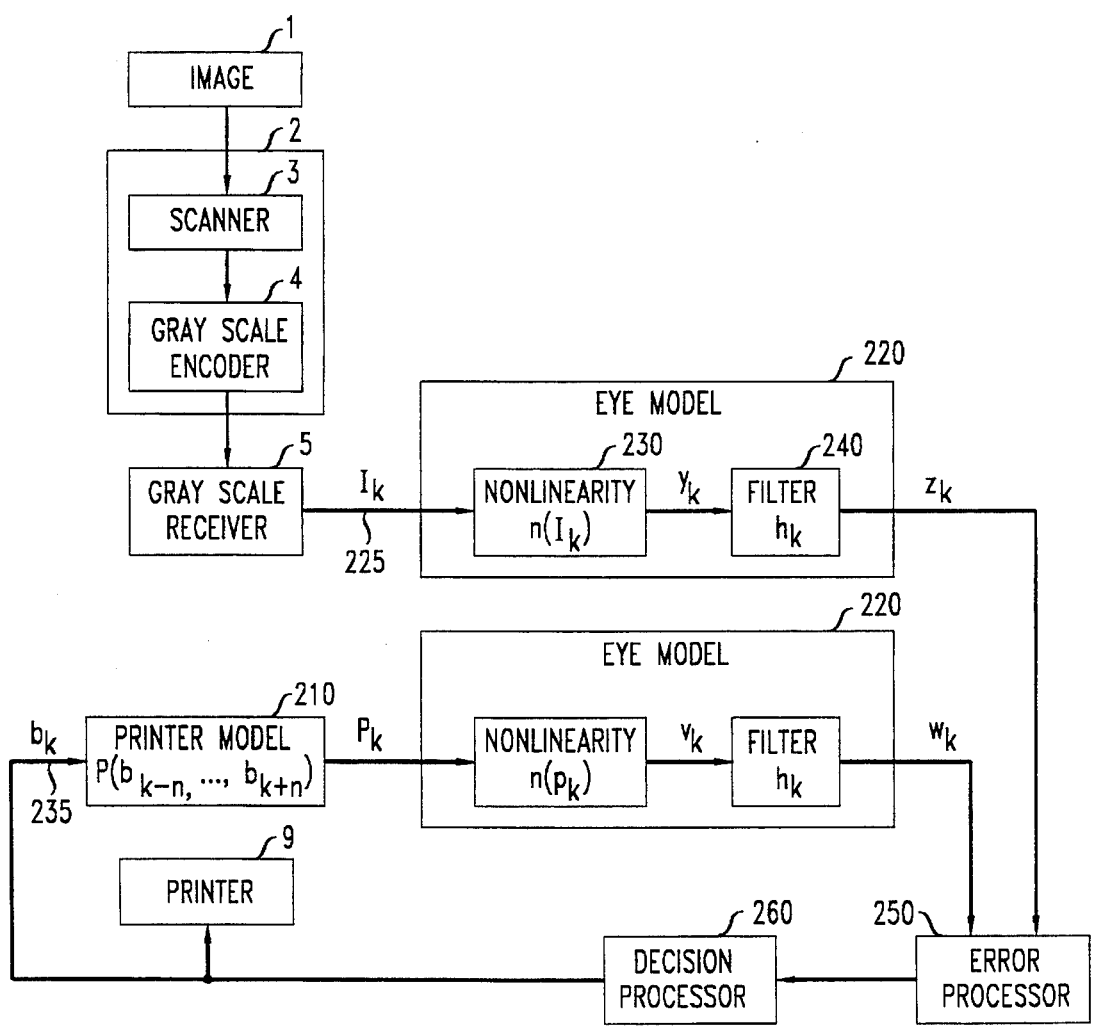
FIG. 13 shows an illustrative facsimile communication system in accordance with the embodiment of FIG. 12.

FIG. 13 presents an illustrative facsimile communication system in accordance with the embodiment of FIG. 12. The system includes it facsimile system 2, comprising a scanner 3 and a grey-scale encoder 4, for transmitting an image 1 to a remote location. The system further includes a grey-scale facsimile receiver/decoder 5 at the remote location to provide a grey-scale image for halftoning. Halftoned images are provided to printer 9 for printing at the remote location. The halftoned images are determined by decision processor 260 in response to errors determined by the error processor 250.

It should be understood that the above-described models, window sizes, filter coefficients and other system and method parameters are merely illustrative. Other particular printer (and eye) models may prove advantageous in particular circumstances, as will be apparent to those skilled in the art.

While it has been assumed that the printer parameters are fixed and known in advance before any of the processing described above, no such limitation is essential to the present invention. That is, it is advantageous in some circumstances to adjust the printer model to account for changes in printer parameters, e.g., over time. In particular, it is possible to sense printer parameters such as dot size or shape as pan of the printing process. Alternatively, such sensing can be accomplished, as required, separately from the actual printing process, i.e., off line. After such sensing, the processing can incorporate the new printer parameters in all future halftoning operations.

```
    * MODIFIED ERROR DIFFUSION HALFTONING OF AN IMAGE
    * USING 3 X 3 PRINTER MODEL
    * USES BILINEAR INTERPOLATION TO EXPAND INPUT IMAGE
    *
 5  *     flag=1: FLOYD AND STEINBERG FILTER
    *     flag=2: JARVIS, JUDICE AND NINKE FILTER
    *          (STUCKI FILTER DEFINED SIMILARLY)
    *
    *
10  *     IMAGE IN: HEIGHT = h1 PIXELS
    *     IMAGE IN: WIDTH = w1 PIXELS
    *
    *     IMAGE OUT: HEIGHT = h2 DOTS = h2_i INCHES
    *     IMAGE OUT: WIDTH = w2 DOTS = w2_i INCHES
15  *
    *     INK SPREADING PARAMETERS: alfa [.33]
    *                               beta [.10]
    *                               gama [.29]
    *
20  *     PRINTER RESOLUTION: resol [300]
    *
    *
    * CONVERSION OF INCHES TO DOTS:  h2 = h2_i*resol
    * CONVERSION OF INCHES TO DOTS:  w2 = w2_i*resol
25  *
    */ error_diffusion(alfa,beta,gama,h1,h2,w1,w2,flag,ptin,ptim,pter,ptou)
    float alfa, beta, gama;
    int   h1, w1, h2, w2;
30  int   flag;
    float *ptin;  /* POINTER TO ARRAY WITH INPUT IMAGE       (GREY-SCALE) */
    float *ptim;  /* POINTER TO ARRAY WITH INTERPOLATED IMAGE (GREY-SCALE) */
    float *pter;  /* POINTER TO ARRAY OF PAST ERRORS         (REAL NUMBER) */
    int   *ptou;  /* POINTER TO ARRAY WITH OUTPUT IMAGE      (BINARY)    */
35  {
``` int i, j;

/* FIRST INTERPOLATE GREY SCALE IMAGE TO GRID RESOLUTION */

```
        for(j = 0; j < h2; j++)
        {
5           for(i = 0; i < w2; i++)
            {
                if(h2 != h1    w2 != w1)
                    *(ptim+j*w2+i) = bilinear(i,j,ptin,h1,w1,h2,w2);
                else
10                  *(ptim+j*w2+i) = *(ptin+j*w1+i);
            }
        }
```

/* NOW APPLY MODIFIED ERROR DIFFUSION */

/* INITIALIZE ERROR IMAGE TO ZERO */

```
15      for(j = 0; j < h2; j++)
            for(i = 0; i < w2; i++)
                *(pter+j*w2+i) = 0.;

for(j = 0; j < h2; j++)
        {
20          for(i = 0; i < w2; i++)
            {
                float pixin, pixink, pixou, ddd;
                unsigned char upix;

pixin = *(ptim+j*w2+i);

25              /* pixin: CURRENT GREY-SCALE VALUE         */
                /* pter: POINTER TO ARRAY CONTAINING PAST ERRORS */

/* APPLY ERROR DIFFUSION FILTER TO PAST ERRORS    */
```

```
                    /* AND ADD TO CURRENT IMAGE VALUE         */ if(flag == 1) pixin += er_dif_flt1(pter,w2,i,j);
                    if(flag == 2) pixin += er_dif_flt2(pter,w2,i,j);

/* THRESHOLD TO GET NEW BINARY POINT */

5                  pixou = ((pixin < 128 ? 0 : 255));

/* GIVEN NEW BINARY POINT UPDATE ERROR */
                    /* USING PRINTER MODEL         */ if(pixou == 255)
                    {
10                    /* NEW PIXEL IS WHITE:                  */
                      /* INK SPREADING FROM KNOWN NEIGHBORS HAS ALREADY BEEN ADDED */

*pter += pixin-pixou;
                    }
                    else
15                  {
                      /* NEW PIXEL IS BLACK:                  */
                      /* ADD INK-SPREADING CONTRIBUTION TO ALL WHITE NEIGHBORS */
                      /* (INCLUDING POINTS IN THE FUTURE, WHICH ARE TEMPORARILY */
                      /* ASSUMED WHITE; IF THEY TURN OUT TO BE BLACK,          */
20                    /* INK-SPREADING WILL BE SUBTRACTED AS IS DONE BELOW FOR */
                      /* CURRENT POINT)              */

/* DEFINE a, b, c, d TO BE THE ALREADY ASIGNED OUTPUT BITS */
                      /* AND nw, nn, ne, ww, xx, ee, sw, ss, sw TO BE POINTERS   */
                      /* TO THE ELEMENTS OF THE ERROR ARRAY IN THE CURRENT WINDOW */
25                    /* AS FOLLOWS (nw STANDS FOR NORTH WEST ETC.   */

/*        c b a    nw nn ne       */
                      /*        d x .    ww xx ee       */
                      /*        . . .    sw ss se       */
```

```
      int    a, b, c, d;
      float *nn, *ss, *ww, *ee;
      float *nw, *ne, *sw, *se;

*pter = pixin-pixou;   /* BLACK PIXEL: REMOVE PREVIOUS INK */

5     if(i < w2-1 && j > 0) a = *(ptou+1-w2);
      else              a = -1;
      if(j > 0)         b = *(ptou-w2);
      else              b = -1;
      if(i > 0   && j > 0) c = *(ptou-1-w2);
10    else              c = -1;
      if(i > 0)         d = *(ptou-1);
      else              d = -1;

nn = pter-w2;
      ss = pter+w2;
15    ww = pter-1;
      ee = pter+1;
      nw = pter-w2-1;
      ne = pter-w2+1;
      sw = pter+w2-1;
20    se = pter+w2+1;

if(d == 255)
      {
        *ww += alfa*255;

if(c == 0)
25      {
          *ww -= beta*255;
        }
      }
      if(b == 255)
30    {
        *nn += alfa*255;
```

```
        if(c == 0)
        {
           *nn -= beta*255;
        }
5       if(a == 0)
        {
           *nn -= beta*255;
        }
     }
10   if(i < w2-1)
     {
        *ee += alfa*255;

if(a == 0)
        {
15         *ee -= beta*255;
        }
     }
     if(j < h2-1)
     {
20      *ss += alfa*255;
     } if(a == 255 && b == 255)
     {
        *ne += gama*255;
25   }
     if(b == 255 && c == 255 && d == 255)
     {
        *nw += gama*255;
     }
30   if(d == 255 && j < h2-1)
     {
        *sw += gama*255;
     }
     if(i < w2-1 && j < h2-1)
```

```
        {
            *se += gama*255;
        } if(a == 255 && b == 0)
        {
            *ee -= gama*255;
        }
        if(b == 255 && c == 255 && d == 0)
        {
            *nn -= gama*255;
        }
        if(b == 0 && c == 255 && d == 255)
        {
            *ww -= gama*255;
        }
        if(d == 0 && j < h2-1)
        {
            *ss -= gama*255;
        }
            }
            pter++;

/* ASSIGN COMPUTED BINARY VALUE TO OUTPUT ARRAY */

*(ptou++) = (int) pixou;
        }
    }
    return();
} float bilinear(i,j,img1,h1,w1,h2,w2)
int   i,j,h1,w1,h2,w2;
float *img1;
```

```
    {
    /*
     * BILINEAR INTERPOLATION FILTER
     *
5    * img1: ORIGINAL FLOATING IMAGE ( h1 X w1 )
     *
     * outpix: FLOATING VALUE OF INTERPOLATED IMAGE ( h2 X w2 )
     *        AT LOCATION [j][i]
     */

10       float outpix, aaaa, bbbb, cccc, dddd;
         float y_fctr, x_fctr, y, x;
         int   xp, xn, yp, yn;

/*
     * (y,x) IS THE LOCATION OF THE CURRENT PIXEL (j,i) IN img1 COORDINATES.
15   * xp: IS THE PREVIOUS HORIZONTAL LOCATION
     * xn: IS THE NEXT HORIZONTAL LOCATION
     * yp: IS THE PREVIOUS VERTICAL LOCATION
     * yn: IS THE NEXT VERTICAL LOCATION
     *
20   */
         y_fctr = ((float) h1)/((float) h2);
         x_fctr = ((float) w1)/((float) w2);

y = y_fctr*j;
         x = x_fctr*i;

25       xp = (int) x;
         xn = xp+1;
         yp = (int) y;
         yn = yp+1;

aaaa = x-xp;
30       bbbb = yn-y;
         cccc = xn-x;
```

```
        dddd = y-yp;

if(xn >= w1) xn = xp;
        if(yn >= h1) yn = yp;

outpix  = *(img1+yn*w1+xp)*dddd*cccc;
5       outpix += *(img1+yp*w1+xp)*bbbb*cccc;
        outpix += *(img1+yp*w1+xn)*aaaa*bbbb;
        outpix += *(img1+yn*w1+xn)*aaaa*dddd;

return(outpix);
    }

10  float er_dif_flt1(pter,w2,i,j)
    int    w2,i,j;
    float *pter;
    {
    /*
15   * FLOYD AND STEINBERG;
     *
     * pter: POINTER TO CURRENT ERROR PIXEL (ERROR IMAGE: h2 X w2 )
     *
     */

20  float flterr, cons;

/* COMPUTE NORMALIZING CONSTANT FOR FILTER:        */
    /* CONSTANT IS FIXED FOR THE IMAGE, EXCEPT AT BOUNDARY POINTS */ cons = 0.;

if(j > 0) cons += 5;
25  if(i > 0)
    {
        cons += 7;
```

```
            if(j > 0) cons += 1;
        }
        if(i < w2-1 && j > 0) cons += 3;

/* FILTER PAST ERRORS:    */
5       /* CHECK FOR BOUNDARY POINTS */ flterr = 0.;

if(j > 0) flterr += *(pter-w2)*(5/cons);
        if(i > 0)
        {
10          flterr += *(pter-1)*(7/cons);
            if(j > 0) flterr += *(pter-w2-1)/cons;
        }
        if(i < w2-1 && j > 0) flterr += *(pter-w2+1)*(3/cons);

return(flterr);
15  } float er_dif_flt2(pter,w2,i,j)
    int   w2,i,j;
    float *pter;
    {
20  /*
     * JARVIS, JUDICE AND NINKE
     * (STUCKI FILTER DEFINED SIMILARLY)
     *
     * pter: POINTER TO CURRENT ERROR PIXEL (ERROR IMAGE: h2 X w2 )
25   *
     */ float flterr, cons;

/* COMPUTE NORMALIZING CONSTANT FOR FILTER:        */
        /* CONSTANT IS FIXED FOR THE IMAGE, EXCEPT AT BOUNDARY POINTS */
```

```
        cons = 0.;

if(j > 0) cons += 7;
        if(j > 1) cons += 5;
        if(i > 0)
  5     {
                cons += 7;
                if(j > 0) cons += 5;
                if(j > 1) cons += 3;
        }
 10     if(i > 1)
        {
                cons += 5;
                if(j > 0) cons += 3;
                if(j > 1) cons += 1;
 15     }
        if(i < w2-1)
        {
                if(j > 0) cons += 5;
                if(j > 1) cons += 3;
 20     }
        if(i < w2-2)
        {
                if(j > 0) cons += 3;
                if(j > 1) cons += 1;
 25     }

/* FILTER PAST ERRORS:    */
        /* CHECK FOR BOUNDARY POINTS */ flterr = 0.;

if(j > 0) flterr += *(pter-w2)*(7/cons);
 30     if(j > 1) flterr += *(pter-w2-w2)*(5/cons);
        if(i > 0)
        {
```

```
            flterr += *(pter-1)*(7/cons);
            if(j > 0) flterr += *(pter-w2-1)*(5/cons);
            if(j > 1) flterr += *(pter-w2-w2-1)*(3/cons);
        }
 5      if(i > 1)
        {
            flterr += *(pter-2)*(5/cons);
            if(j > 0) flterr += *(pter-w2-2)*(3/cons);
            if(j > 1) flterr += *(pter-w2-w2-2)/cons;
10      }
        if(i < w2-1)
        {
            if(j > 0) flterr += *(pter-w2+1)*(5/cons);
            if(j > 1) flterr += *(pter-w2-w2+1)*(3/cons);
15      }
        if(i < w2-2)
        {
            if(j > 0) flterr += *(pter-w2+2)*(3/cons);
            if(j > 1) flterr += *(pter-w2-w2+2)/cons;
20      } return(flterr);
    }
```

We claim:

1. A method for generating an array of output binary signals suitable for application to a display device to generate a halftone image in response to an array of input signals characterizing a gray-scale image, said method comprising the steps of:

(a) filtering said input signals using a first eye-model filter reflecting characteristics of human vision to derive first signals representative of an estimate of the gray scale image as perceived by a human eye;

(b) filtering sequences of binary signals using a filter reflecting characteristics representative of said display device to produce second signals representing an estimate of an output of said display device;

(c) filtering said second signals using a second eye-model filter to produce third signals;

(d) forming an error signal representative of a difference between said first and third signals; and (e) selecting as the output binary signals to be applied to said display device one of said sequences of binary signals which sequence realizes a preselected error criterion.

2. The method of claim 1 wherein said error criterion is a minimum square error criterion.

3. The method of claim 1 wherein said selecting of said binary signals is accomplished in accordance with a Viterbi algorithm.

4. The method of claim 1 wherein said first eye-model filter and said second eye-model filter are identical.

5. A system for printing halftone images on a printing surface in response to an array of input signals characterizing a gray scale image, the system comprising:

printing means for generating spots at selected ones of regularly spaced positions on said printing surface in response to an ordered sequence of applied binary signals;

means for filtering said input signals using a first eye-model filter reflecting characteristics of human vision to derive first signals representative of an estimate of the gray-scale image as perceived by a human eye;

means for filtering sequences of binary signals using a filter reflecting characteristics representative of said printing means to produce second signals representing an estimate of an output of said printing means;

means for filtering said second signals using a second eye-model filter to produce third signals;

means for forming an error signal representative of a difference between said first and third signals; and means for applying to said printing means one of said sequences of binary signals which sequence realizes a preselected error criterion.

6. The system of claim 5 wherein said means for applying comprises means for realizing a minimum square error for said error signal.

7. The system of claim 5 wherein said means for applying comprises means for performing a Viterbi algorithm.

8. The system of claim 5 further comprising means for determining characteristics of said printing means by monitoring printed output from said printing means.

9. The system of claim 8 wherein said means for determining comprises means for sensing the size of dots produced by said printing means.

10. The system of claim 5 wherein the means for forming an error signal comprises a means for determining a squared error over at least a portion of said first and third signals.

11. The system of claim 5 further comprising means for performing a halftoning technique on the gray-scale image to provide a sequence of binary signals.

12. The system of claim 5 further comprising means for determining characteristics of said printing means by monitoring printed output from said printing means.

13. The system of claim 5 wherein said first eye-model filter and said second eye-model filter are identical.

14. A facsimile system for printing halftone images on a printing surface at a second location corresponding to a gray scale image at a first location, the facsimile system comprising:

means for receiving at said second location an ordered sequence of gray-scale coded signals representing said gray scale image;

printing means for generating spots at selected ones of regularly spaced positions on the printing surface in response to an ordered sequence of applied binary signals;

means for filtering gray-scale coded signals using a first eye-model filter reflecting characteristics of human vision to derive first signals representative of an estimate of the gray-scale image as perceived by a human eye;

means for filtering sequences of binary signals using a filter reflecting characteristics representative of said printing means to produce second signals representing an estimate of an output of said printing means;

means for filtering said second signals using a second eye-model filter to produce third signals;

means for forming an error signal representative of a difference between said first and third signals; and means for applying to said printing means one of said sequences of binary signals which sequence realizes a preselected error criterion.

15. The system of claim 14 further comprising means at said first location for generating said ordered sequence of gray-scale coded signals.

16. The system of claim 15 wherein said means for generating said ordered sequence of gray-scale coded signals comprises means for scanning said gray-scale image to form a sequence of values corresponding to sequential locations on said image and means for coding each of said sequence of values.

17. The facsimile system of claim 14 wherein said first eye-model filter and said second eye-model filter are identical.

18. A method for generating an array of output binary signals suitable for application to a display device to generate a halftone image in response to an array of input signals characterizing a gray-scale image, said method comprising the steps of:

(a) filtering sequences of binary signals using a filter reflecting characteristics representative of said display device to produce first signals representing an estimate of an output of said display device;

(b) filtering said first signals using an eye-model filter to produce second signals;

(c) forming an error signal representative of a difference between said input and second signals; and (d) selecting as the output binary signals to be applied to said display device one of said sequences of binary signals which sequence realizes a preselected error criterion.

19. A method for communicating an image for printing comprising the steps of:
- a encoding the image and transmitting its encoded representation;
- b receiving the encoded representation of the image and decoding it to generate a decoded representation of the image;
- c determining a halftone image based on the decoded representation of the image, wherein one or more input signals reflect the decoded representation of the image, and wherein the step of determining a halftone image includes the steps of:
  - 1 filtering sequences of binary signals using a filter reflecting characteristics representative of a printing device to produce first signals representing an estimate of output signals of said printing device,
  - 2 filtering said first signals using an eye-model filter to produce second signals,
  - 3 forming an error signal representative of a difference between said input and second signals,
  - 4 selecting as the binary signals of the halftone image to be applied to said printing device one of said sequences of binary signals which sequence realizes a preselected error criterion; and
- d printing the halftoned image with use of the selected sequence of binary signals.

20. The method of claim 19 wherein said error criterion is a minimum square error criterion.

21. The method of claim 19 wherein said selecting of said binary signals is accomplished in accordance with a Viterbi algorithm.

* * * * *